United States Patent [19]

Hedeen

[11] Patent Number: 5,124,600
[45] Date of Patent: Jun. 23, 1992

[54] INTEGRAL SILENCER FOR ELECTRIC MOTORS

[75] Inventor: Robert A. Hedeen, Clifton Park, N.Y.

[73] Assignee: General Electric Company, Schenectady, N.Y.

[21] Appl. No.: 641,324

[22] Filed: Jan. 15, 1991

Related U.S. Application Data

[63] Continuation of Ser. No. 445,504, Dec. 4, 1989, abandoned.

[51] Int. Cl.[5] .......................... H02K 5/24; H02K 9/06
[52] U.S. Cl. ............................................. 310/51; 310/62
[58] Field of Search .................. 310/85, 89, 51, 62, 310/63; 181/198, 200, 202, 230, 250, 260

[56] References Cited

U.S. PATENT DOCUMENTS

| | | | |
|---|---|---|---|
| 1,705,778 | 3/1929 | Munroe et al. | 310/51 |
| 2,272,985 | 2/1942 | Smith | 310/51 |
| 2,881,337 | 4/1959 | Wall | 310/51 |
| 2,886,721 | 5/1959 | Picozzi et al. | 310/51 |
| 3,389,278 | 6/1968 | Jaeschke | 310/51 |
| 3,451,503 | 6/1969 | Twomey | 181/202 |
| 3,741,336 | 6/1973 | Malosk | 181/266 |
| 3,980,912 | 9/1976 | Panza | 310/51 |
| 4,150,313 | 4/1979 | Panza | 310/51 |
| 4,330,899 | 5/1982 | Miller et al. | 417/368 |
| 4,596,921 | 6/1986 | Hersh et al. | 310/51 |
| 4,733,750 | 3/1988 | Poirier et al. | 181/202 |

FOREIGN PATENT DOCUMENTS

| | | | |
|---|---|---|---|
| 0028209 | 3/1978 | Japan | 181/202 |
| 0099241 | 6/1983 | Japan | 310/51 |
| 0217833 | 9/1987 | Japan | 310/51 |
| 0277044 | 12/1987 | Japan | 310/51 |
| 0121445 | 5/1988 | Japan | 310/51 |
| 0140641 | 6/1988 | Japan | 310/51 |
| 1145416 | 3/1985 | U.S.S.R. | 310/51 |
| 1436197 | 11/1988 | U.S.S.R. | 310/51 |
| 0357147 | 9/1931 | United Kingdom | 181/202 |

OTHER PUBLICATIONS

Leo L. Beranek, Noise and Vibration Control, 1971, 365–367.

Primary Examiner—Steven L. Stephan
Assistant Examiner—C. LaBalle
Attorney, Agent, or Firm—Patrick R. Scanlon; James C. Davis, Jr.; Paul R. Webb, II

[57] ABSTRACT

An electrical motor with integral silencer is provided having a motor housing defining an inlet aperture at one end and an expansion chamber at the other end. The expansion chamber has a reduced cross-sectional area at the entrance and exit of the expansion chamber compared to the cross-sectional area of the chamber. The exit of the expansion chamber provides an outlet aperture in the housing. A stator is situated in the housing and a rotor is rotatably mounted within the stator. A fan is secured to the rotor and rotates therewith for pulling air in the outlet aperture through the stator and exhausting the air through the expansion chamber to the housing exterior. The expansion chamber provides an impedance mismatch for the acoustic energy generated by the fan preventing a portion of the acoustic energy from exiting the expansion chamber.

7 Claims, 6 Drawing Sheets

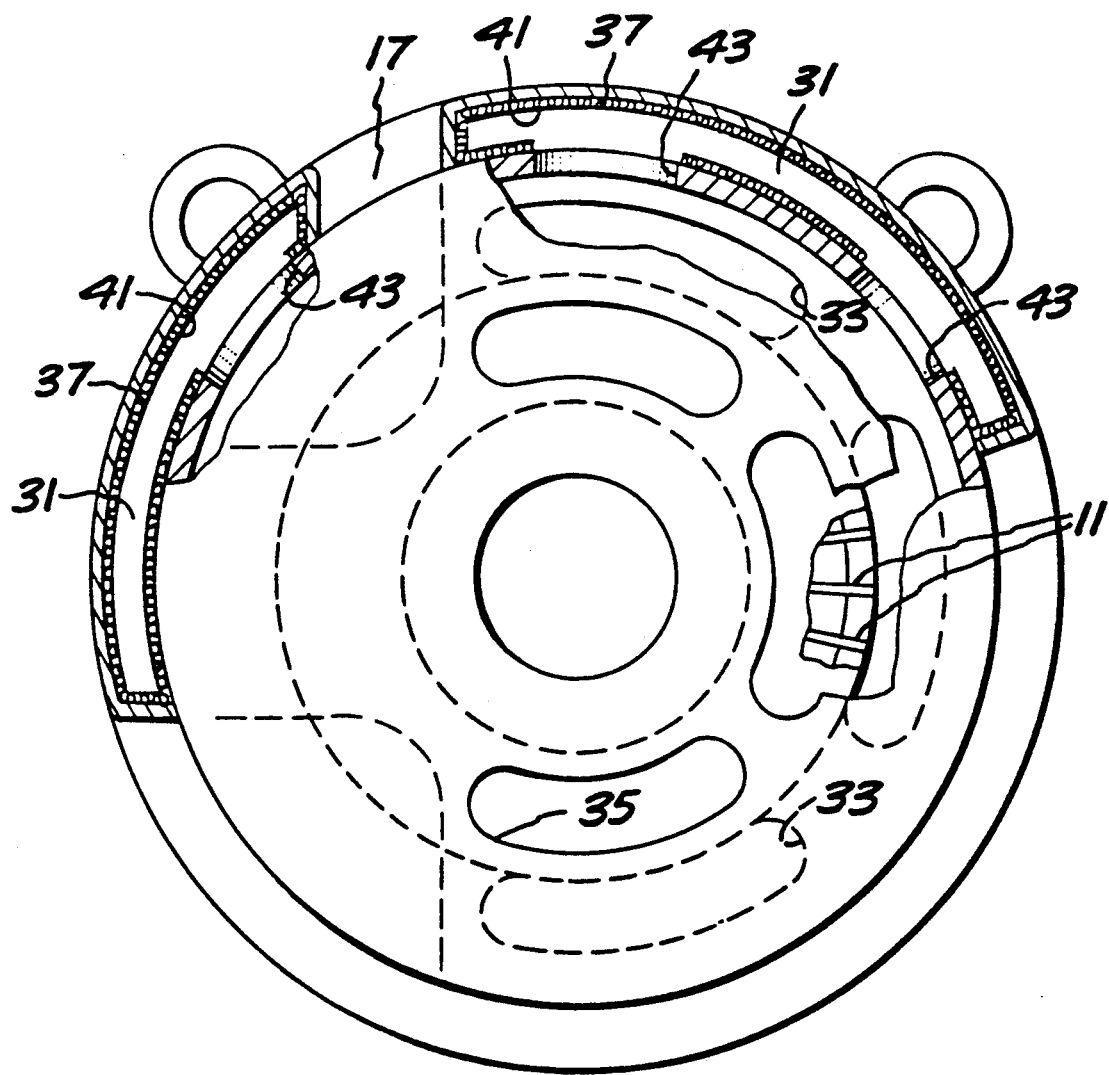

INTEGRAL SILENCER FOR ELECTRIC MOTORS

This application is a continuation of application Ser. No. 07/445,504 filed Dec. 4, 1989 abandoned.

BACKGROUND OF THE INVENTION

The present invention is related to the use of expansion chambers or expansion chambers and resonators to reduce electric motor fan noise.

Large electric motors are commonly cooled with in-line fans which draw or blow cooling air across the rotor and through the stator windings. At high speed, these fans can produce significant levels of noise. The noise is typically broad-band in character due to flow turbulence with embedded tones from the fan blade passage.

In transit car applications, the traction motors can develop undesirable levels of noise which are particularly noticeable since wheel and rail noises have been significantly reduce in modern cars due to the use of welded rails and rubber damped wheels.

Reactive silencers using tuned ports, resonators, and expansion chambers are the basis for designing mufflers on internal combustion engines.

It is an object of the present invention to provide electric motors with reduced noise levels at all operating speeds.

SUMMARY OF THE INVENTION

In one aspect of the present invention an electrical motor with integral silencer is provided having a motor housing defining an inlet aperture at one end and an expansion chamber at the other end. The expansion chamber has a reduced cross-sectional area at the entrance and exit of the expansion chamber compared to the cross-sectional area of the chamber. The exit of the expansion chamber provides an outlet aperture in the housing. A stator is situated in the housing and a rotor is rotatably mounted within the stator. A fan is secured to the rotor and rotates therewith for pulling air in the outlet aperture through the stator and exhausting the air through the expansion chamber to the housing exterior. The expansion chamber provides an impedance mismatch for the acoustic energy generated by the fan preventing a portion of the acoustic energy from exiting the expansion chamber.

BRIEF DESCRIPTION OF THE DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in conjunction with the accompanying drawing figures in which:

FIG. 3 is a partially cutaway end view of the motor of FIG. 2;

DETAILED DESCRIPTION OF THE INVENTION

Figure 1:
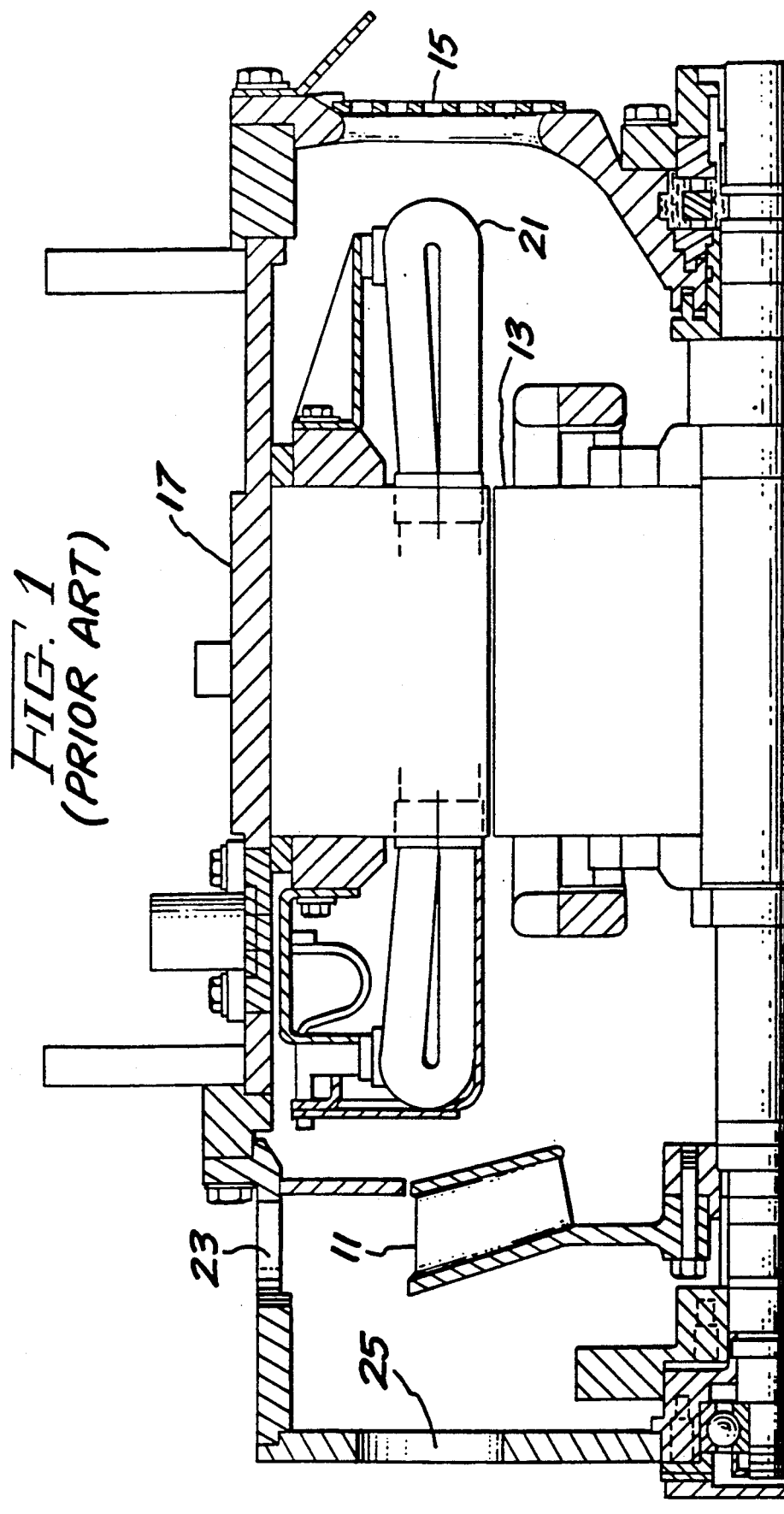
FIG. 1 is a partial sectional side view of a prior art AC traction motor showing the air inlet and outlet passageways and an in-line fan.

Referring now to the drawing wherein like numerals indicate line elements throughout and particularly FIG. 1 thereof, the prior art AC traction motor is shown having an in-line cooling fan 11. During operation, the fan rotates with the rotor 13, directing the air pulled in through cooling ducts 15 at one end of the housing 17 through the stator winding 21 and the gap between the rotor 13 and the stator 21, out the exhaust ducts 23 disposed radially outwardly from the fan 11. Cooling air is also drawn through the ducts 25 at the opposite end of the motor and directed radially outwardly by the fan. The fan at high speeds produces significant levels of noise.

Figure 2:
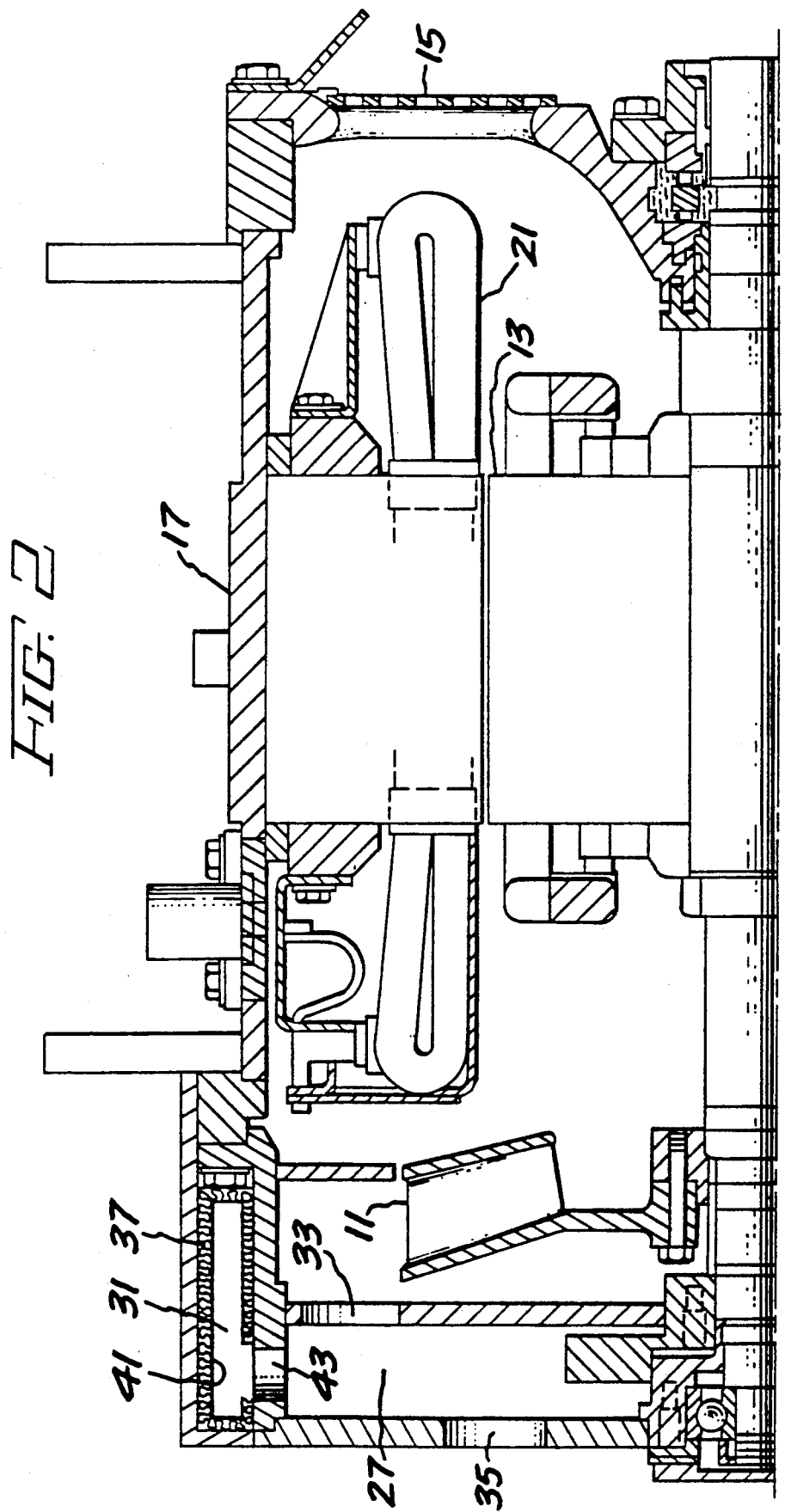
FIG. 2 is a partial sectional side view of a motor having an integral silencer in accordance with the present invention.

Referring now to FIGS. 2 and 3 an AC motor with an integral silencer in accordance with the present invention is shown. Air is drawn into the motor through inlet ducts 15 and passes through the stator 21 and in the air gap between the stator and the rotor 13 and is directed by the fan 11 through an expansion chamber 27 to the outside atmosphere. The expansion chamber 27 communicates with a lined resonating chamber 31 which is located outside the air flow path. The expansion chamber 27 has a plurality of inlet and outlet passageways 33 and 35, respectively. The total crosssectional area of the inlet passageways is less than the cross-sectional area of the expansion chamber. The total cross-sectional area of the outlet passageways is also less than the cross-sectional area of the expansion chamber. The outlet passageways 35 of the expansion chamber 27 also serve to exhaust the cooling air from the housing. The resonating chamber is lined with a porous acoustical sound absorbing material such as mineral wool 37. The absorptive material is preferably protected behind thin preferable metal sheets or wire screen 41. The expansion chamber 27 is located at the end of the motor housing opposite the air intake duct 15. The resonator chamber 31 at least partially circumferentially surrounds the expansion chamber with a plurality of openings 43 located between the resonating chamber 31 and the expansion chamber 27. The amount of noise attenuation achieved depends on the volume of the resonating and expansion chambers as well as the size and length of the openings leading in and out of the chambers. The size of the inlet and outlet passageways to the motor housing is also dictated by the air flow required for cooling purposes through the motor.

Figure 4A:
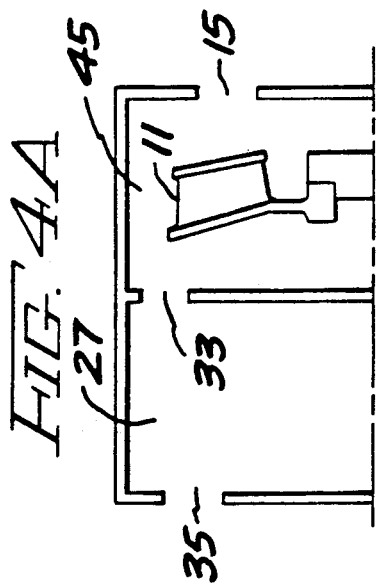
FIGS. 4A, B, and C show a schematic representation of an electric motor in-line fan in a plenum which exhausts air through an unlined expansion chamber in accordance with one embodiment of the present invention, the corresponding impedance-type analogous circuit for the schematic representation, and a graph of the transmission loss as a function of frequency for the schematic representation, respectively.
Figure 4B:
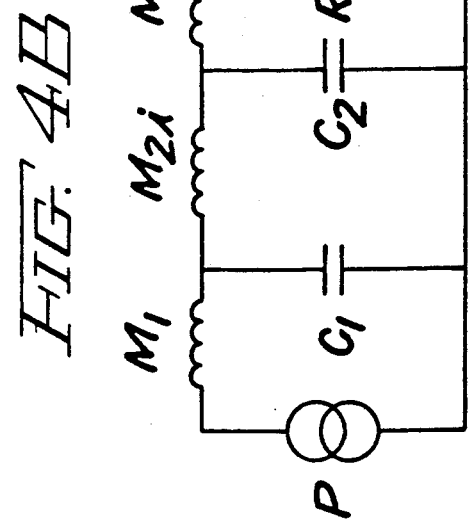

A schematic diagram showing exhaust air driven by an electric motor in-line fan 11 in a plenum 45 through an expansion chamber 27 is shown in FIG. 4A. FIG. 4B shows an impedance-type analogous circuit of the schematic of FIG. 4A. The impedance-type analogous circuit has a voltage source P analogous to the acoustic pressure of the fan. The voltage source is in series with an inductor $M_1$ which represents the acoustic mass displaced by the fan and a capacitor $C_1$ representing the acoustic compliance of the fan plenum. In parallel with capacitor $C_1$ are an inductor $M_{2i}$ representing the acoustic mass of the orifice leading into the expansion chamber and a capacitor $C_2$ representing the acoustic compliance of the expansion chamber. In parallel with capacitor $C_2$ are an inductor $M_{2o}$ representing the acoustic mass of the outlet orifice of the expansion chamber and an impedance $Z_{rad}$ representing the radiation impedance of the outlet of the expansion chamber.

Figure 4C:
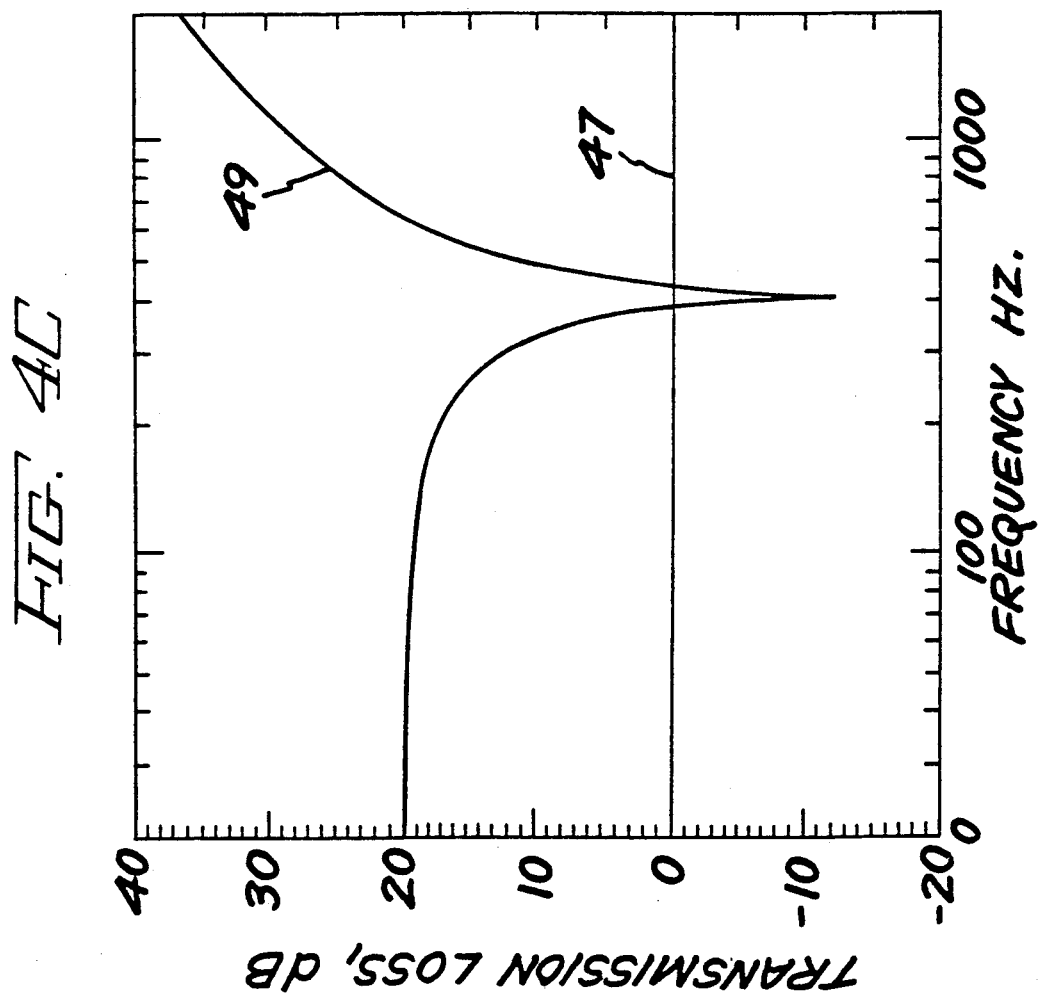

Referring now to FIG. 4C the graph has a horizontal line 47 at 0 dB representing the noise level without the use of an expansion chamber. The curve 49 shows the transmission loss at different frequencies. The noise levels are reduced by 10 to 20 dB at most frequencies, but a pure tone is produced at the resonant frequency of the expansion chamber which is louder than the noise at that frequency without the use of an expansion chamber. The performance of the expansion chamber is determined primarily by its volume and the size of the entrance and exit apertures. The chamber creates an impedance mismatch for the acoustic energy generated by the fan and traveling through the chamber. The impedance mismatch results in a reflection of part of the energy back towards the source of the sound, preventing that part from being transmitted outside the expansion chamber exit. The impedance provided by the chamber varies as a function of frequency and at the resonant frequency the acoustic energy is amplified rather than reduced.

Figure 5A:
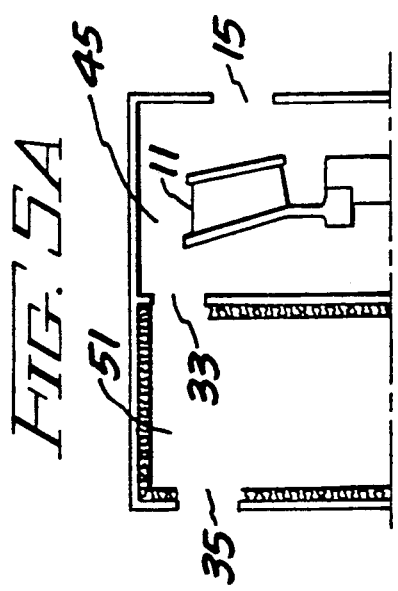
FIGS. 5A, B and C show a schematic representation of an electric motor in-line fan in a plenum which is exhausted through an expansion chamber lined with porous acoustic material in accordance with another embodiment of the present invention, an impedance-type analogous circuit representation of the schematic representation, and a graph showing the transmission loss versus frequency for different damping values produced by the lining in the schematic representation, respectively.
Figure 5B:
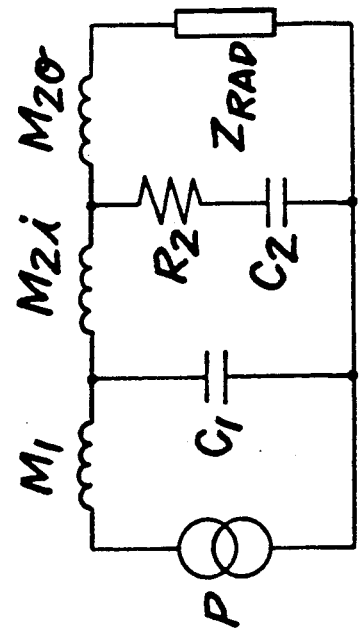

Referring now to FIG. 5A a schematic representation of an electric motor fan 11 exhausting air through a lined expansion chamber 51 is shown. The impedance-type analogous circuit is the same as shown in FIG. 4B with the addition of a resistor $R_2$ in series with capacitor $C_2$. $R_2$ represents the acoustic resistance of the expansion chamber which is dependent on the amount, placement, and characteristics of the porous acoustic material used as the lining of the chamber.

Figure 5C:
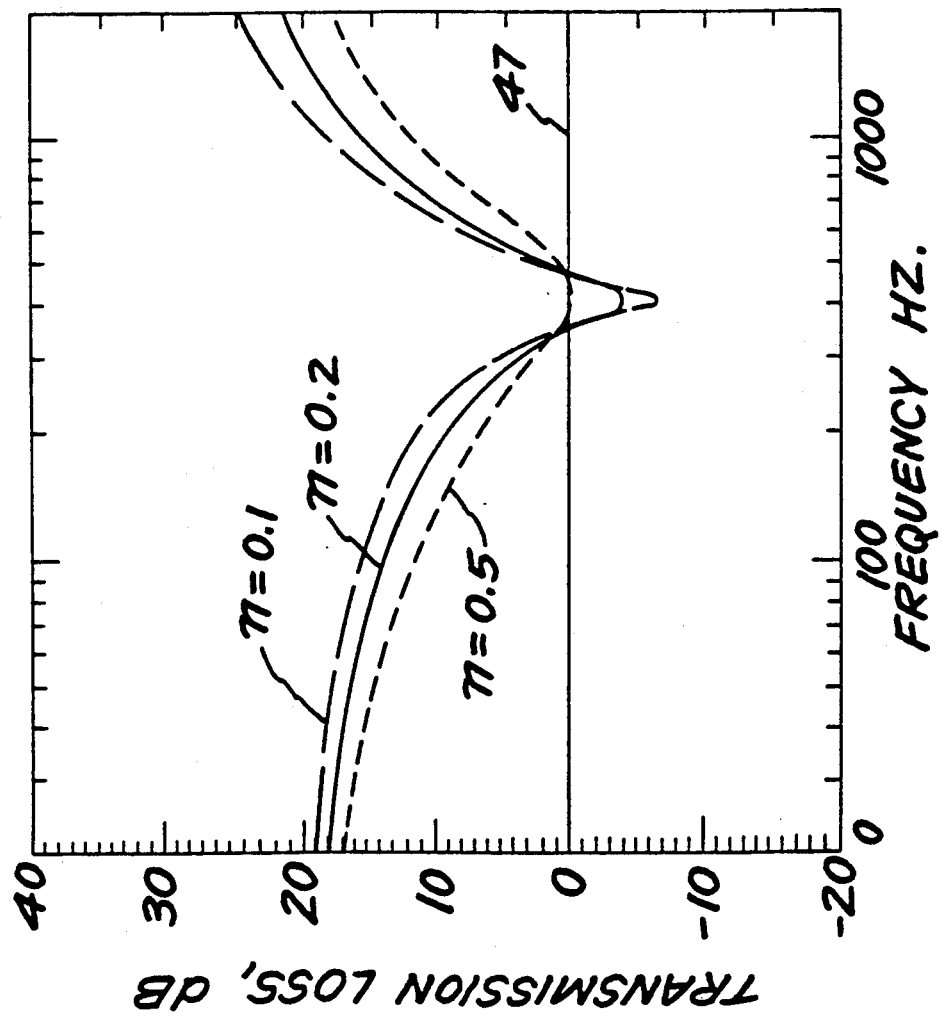

The graph in FIG. 5C shows the transmission loss for various values of the damping factor $\eta$ which is proportional to the lining resistance $R_2$. An overall 10-20 dB reduction is obtained at most frequencies with the pure tone at the resonant frequency of the chamber reduced by the presence of the acoustic lining. The acoustic lining resists the movement of air particles taking energy out of the sound waves and thus providing wideband noise reduction characteristics.

Figure 6A:
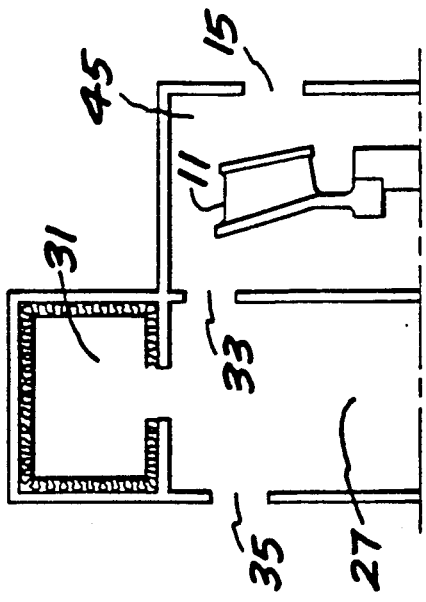
FIGS. 6A, B and C show a schematic representation of an electric motor in-line fan in a plenum which exhausts air through an unlined expansion chamber with a lined resonator situated out of the main air stream in accordance with the present invention, an impedance-type analogous circuit representation of the schematic, and a graph showing transmission loss versus frequency with and without the lined resonator present respectively.
Figure 6B:
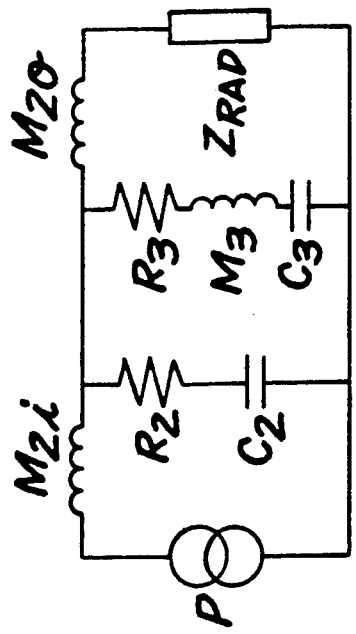
Figure 6C:
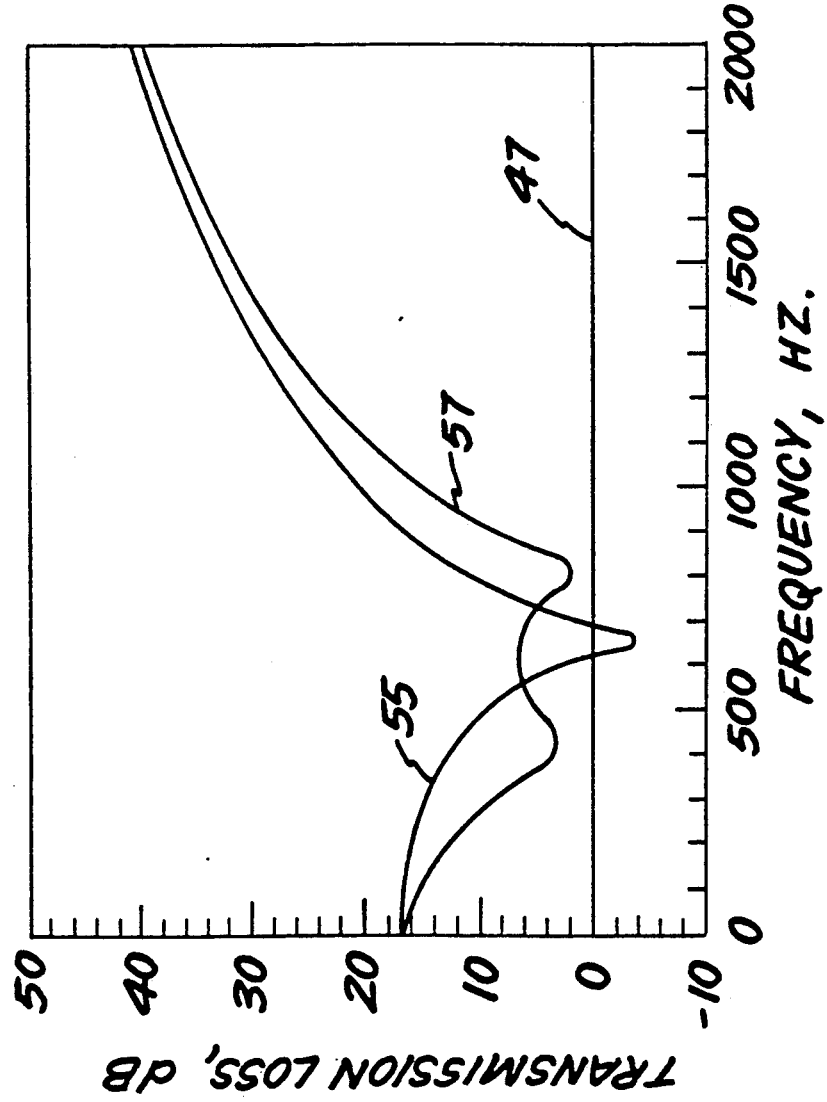

Referring now to FIG. 6A a schematic representation of an electric motor fan 11 situated in a fan plenum 45 exhausting air through an expansion chamber 27 having a lined resonating chamber 31 out of the flow path is shown. The impedance-type analogous circuit has a voltage source P analagous to the acoustic pressure of the fan. The circuit elements $M_1$ and $C_1$, representing the acoustic mass and compliance of the fan plenum, are not shown in this circuit as they have little effect on the silencer performance. Inductor $M_{2i}$ represents the acoustic mass of the expansion chamber inlet, resistor $R_2$ represents the acoustic resistance of the expansion chamber and capacitor $C_2$ represents the acoustic compliance of the expansion chamber. In parallel with $R_2$ and $C_2$ are series connected resistor $R_3$, inductor $M_3$, and capacitor $C_3$. The resistor $R_3$ represents the acoustic resistance of the resonating chamber 31. The inductor $M_3$ represents the acoustic mass of the orifice leading to the resonating chamber. The capacitor $C_3$ represents the acoustic compliance of the resonating chamber. In parallel with $R_3$, $M_3$, and $C_3$ are inductor $M_{2o}$ representing the acoustic mass of the expansion chamber outlet and impedance $Z_{rad}$ representing the radiation impedance of the outlet of the expansion chamber.

The graph 6C shows both the transmission loss due to just the expansion chamber and due to just the lined resonator 57. The lined resonator is most effective at reducing noise at its resonant frequency which determined by its volume and dimensions of the openings. If the resonant frequency is selected to be substantially the same as the resonant frequency of the expansion chamber the pure tone generated by the expansion chamber can be reduced. The overall noise reduction which is the sum of the two curves results in a 10 dB noise reduction without an objectionable pure tone being created. The curves were produced assuming a resonating chamber volume of 61.2 in.$^3$, a damping factor $\eta = 0.5$ and an aperture leading to the resonating chamber of 14 in.$^2$. The expansion chamber was assumed to have a volume of 113 in.$^3$ an, inlet and outlet passageway each having a cross-sectional area of 40 in.$^2$, and the length of the passageways from all the chambers of 0.5 inches. The volume of the fan plenum was found not to significantly effect the calculations.

While improved performance was obtained with the use of both an expansion chamber and a resonating chamber in some applications an expansion chamber above can provide satisfactory noise attenuation.

The foregoing has described an electric motor with an integral silencer with reduced noise levels at all operating speeds.

While the invention has been particularly shown and described with reference to several embodiments thereof, it will be understood by those skilled in the art that various changes in form and detail may be made without departing from the spirit and scope of the invention.

What is claimed is:

1. An electric motor with an integral silencer comprising:
    a motor housing having a longitudinal axis and defining an inlet aperture at one end and an expansion chamber at the other end, said expansion chamber having an entrance and an exit, the exit of the expansion chamber providing an outlet aperture for said housing, said entrance and said exit both having a cross-sectional area taken across said longitudinal axis which is smaller than a cross-sectional area of said expansion chamber taken across said longitudinal axis;
    a stator situated in said housing;
    a rotor rotatively mounted within said stator; and
    a fan secured to said rotor and rotatable therewith for pulling air in said inlet aperture through said stator and through said expansion chamber to the housing exterior, said expansion chamber providing an impedance mismatch for the acoustic energy generated by said fan preventing a portion of the acoustic energy from exiting the expansion chamber.

2. The electrical motor with integral silencer of claim 1 wherein at least one interior surface of said expansion chamber is covered with a porous acoustical material.

3. The electric motor of claim 1 wherein said motor housing further defines a resonating chamber which opens into said expansion chamber with said opening having a cross-sectional area smaller than the cross-sectional area of the resonating chamber, the air drawn by the fan does not flow through the resonating chamber, the resonant frequency of said resonating chamber selected to substantially match the resonant frequency of said expansion chamber.

4. The electric motor of claim 3 wherein at least a portion of the interior of the resonating chamber is covered with porous acoustical material.

5. An electric motor with an integral silencer comprising:
- a substantially cylindrical motor housing having an inlet aperture at one end thereof;
- a substantially cylindrical expansion chamber concentrically disposed within said motor housing at an end opposite from said inlet aperture, said expansion chamber having an entrance and an exit, the exit of the expansion chamber providing an outlet aperture for said housing;
- at least one partially annular resonating chamber disposed within said motor housing and having an opening into said expansion chamber;
- a stator situated in said housing;
- a rotor rotatively mounted within said stator; and
- a fan secured to said rotor and rotatable therewith for pulling air in said inlet aperture through said stator and through said expansion chamber to the housing exterior.

6. The electric motor of claim 5 wherein at least a portion of the interior of said resonating chamber is covered with a sound absorbing material.

7. The electric motor of claim 5 wherein said resonating chamber has a resonate frequency substantially matching the resonate frequency of said expansion chamber.

* * * * *